United States Patent [19]

Oguro et al.

[11] Patent Number: 5,268,082
[45] Date of Patent: Dec. 7, 1993

[54] ACTUATOR ELEMENT

[75] Inventors: Keiskue Oguro; Hiroyasu Takenaka; Youji Kawami, all of Osaka, Japan

[73] Assignee: Agency of Industrial Science & Technology, Ministry of International Trade & Industry, Tokyo, Japan

[21] Appl. No.: 841,518

[22] Filed: Feb. 26, 1992

[30] Foreign Application Priority Data

Feb. 28, 1991 [JP] Japan .................................... 3-59793

[51] Int. Cl.$^5$ .............................................. H01G 9/00
[52] U.S. Cl. .................................. 204/282; 204/252; 310/800; 604/20; 604/22; 604/95; 128/772
[58] Field of Search ............... 204/282, 283, 296, 252; 521/24; 252/62.9; 310/800; 84/DIG. 24; 137/82; 251/368; 664/20, 21, 22, 95, 27; 128/772

[56] References Cited

U.S. PATENT DOCUMENTS 4,191,618  3/1980  Coker et al. .................. 204/296
4,272,353  6/1981  Lawrance et al. .............. 204/283

OTHER PUBLICATIONS

Grodzinsky et al., "Electromechanical Transduction with Charged Polyelectrolyte Membranes", IEEE Transaction on Biomedical Engineering, vol. BME-23, No. 6, p. 421-433, 11-76.

*Primary Examiner*—Kathryn Gorgos
*Attorney, Agent, or Firm*—Oblon, Spivak, McClelland et al.

[57] ABSTRACT

An actuator element comprises an ion exchange membrane and a pair of electrodes attached to opposite surfaces of the ion exchange membrane; the ion exchange membrane in a water-containing state being caused to bend and/or deform by application of an electric potential difference thereacross.

9 Claims, 2 Drawing Sheets

ACTUATOR ELEMENT

BACKGROUND OF THE INVENTION

1. Field of the Invention

This invention relates to an actuator element, and more particularly to an ultra-small actuator element wherein an ion exchange membrane is bowed or deformed.

2. Description of the Prior Art

In a highly miniaturized actuator, frictional and viscous forces dominate over inertial forces. Because of this, it is considered difficult to realize an ultra-small actuator using a motor, engine or other mechanism which converts energy to motion. The ultra-small actuators proposed up to now can be classified by operating principle into, inter alia, the electrostatic attraction type, piezoelectric type, ultrasonic type, shape-memory alloy type and polymer expansion type.

In the electrostatic attraction type actuator, plate or rod electrodes are attracted to each other. There have been developed actuators of this type in which a voltage of around 100 V is applied across two electrodes separated by dozens of $\mu$m so as to cause one to bend toward the other. The piezoelectric type actuator has a piezoelectric element formed of a ceramic material, such as barium titanate, which is caused to expand and contract by the application of dozens of positive volts. Some are able to control displacement on the nanometer order. The ultrasonic type actuators include some driven by using a combination of frictional force and ultrasonic vibration produced by a piezoelectric element for causing the element to shift. The shape-memory alloy type actuator, which uses an alloy whose shape changes greatly with temperature, is driven by temperature variation. The polymer expansion type actuator uses a polymer fiber that expands and contracts with changes in temperature, pH or concentration of an ambient chemical substance.

However, all of the conventional ultra-small actuators have drawbacks of one sort or another. Some are limited as to the environment in which they can operate, others exhibit inadequate response or are overly complex in structure, and still others cannot be used in a living organism because they lack the pliancy required for ensuring that the living tissue will not be injured.

Even though the conventional polymer expansion type actuator does exhibit pliancy, its operation requires the solution in contact with the polymer fiber to be exchanged with another solution containing a salt, and therefore, it is not appropriate for use in applications requiring a miniature actuator with rapid response. While electrically driven polymer actuators have also been developed, they require a driving voltage at least as high as that at which electrolysis of water occurs, which makes them difficult to use in a living organism or other such closed system.

The object of the present invention is to provide an actuator element that is simple in structure, can be readily miniaturized, exhibits rapid response, operates at lower power and is pliant.

SUMMARY OF THE INVENTION

The invention achieves this object by providing an actuator element comprising an ion exchange membrane and a pair of electrodes attached to opposite surfaces of the ion exchange membrane, the ion exchange membrane in a water-containing state being caused to bend and/or deform by application of an electric potential difference thereacross.

Since the actuator element according to the invention is constituted as a composite body comprising an ion exchange membrane and electrodes, it is of a simple structure readily amenable to miniaturization, exhibits rapid response, is pliant and can operate in a water-containing state. As such, it is ideal for use as the driving element for the tip of an active catheter, an implanted micropump or other such medical device used in vivo.

The above and other objects, characteristic features and advantages of the present invention will become more apparent to those skilled in the art as the disclosure of the present invention is made hereinbelow with reference to the accompanying drawings.

DESCRIPTION OF THE PREFERRED EMBODIMENT

The present invention will now be described in detail with reference to the illustrated embodiment.

Figure 1:
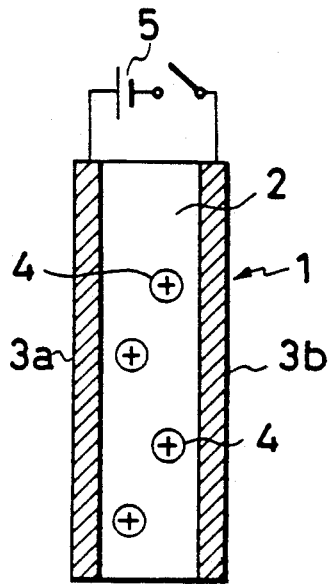
FIG. 1 is a schematic view illustrating one embodiment of the actuator element according to the present invention before the application of an electric potential thereto.

FIG. 1 illustrates one embodiment of an actuator element 1 according to the present invention. The actuator element 1 consists of an ion exchange membrane 2 and a pair of electrodes 3a, 3b, one attached to either surface of the ion exchange membrane 2.

The ion exchange membrane 2 may be either a cation exchange membrane or an anion exchange membrane. Usable cation exchange membranes include polystyrene sulfonic acid membranes and fluororesin-based ion exchange membranes having sulfonate or carboxylate groups. An example of a usable anion exchange membrane is one of fluororesin-based membrane containing tertiary ammonium groups. Preferable materials for the thin electrodes 3a, 3b attached to the opposite surfaces of the ion exchange membrane are noble metals such as gold, platinum, iridium, palladium, rhodium and ruthenium. It is also possible to use an electrically conductive polymer, graphite or other such material which exhibits both electrical conductivity and resistance to corrosion.

The electrode material can be attached to the ion exchange membrane 2 by any of various known methods including chemical plating, electroplating, vacuum deposition, sputtering, coating, pressure-adhesion or the like.

After the electrode material has been attached to the opposite surfaces of the ion exchange membrane 2 by one of these methods, the resulting composite body is, if required, cut to a prescribed size for obtaining the actuator element 1 according to this invention.

After the ion exchange membrane has been put into a water-containing state by soaking in or spraying with an aqueous solution, if a dc voltage of about 0.1–2 V is applied across the electrodes 3a, 3b, the actuator element 1 will, within a response time of not more than 0.1 sec, undergo a displacement proportional to the square of its length. The actuator element 1 bows in the opposite direction when the polarity of the applied voltage is reversed, thus exhibiting a high degree of pliancy. Moreover, the actuator element 1 can be caused to produce a flexing or vibrating motion of a desired frequency by applying an ac voltage thereto. The magnitude of the bending can be increased by forming the ion exchange membrane into a thin rod-like shape or by increasing the voltage applied. By selecting the membrane thickness and/or the applied voltage, it is possible to realize an actuator element which, when operating in water, is capable of producing a large enough displacement to overcome the viscous resistance of the water. Since the element becomes rigid and declines in ability to conduct electric current when it becomes dry, however, some special measure such as spraying with an aqueous solution has to be implemented when it is operated in air.

As is clear from the foregoing, the ion exchange membrane of the actuator element according to this invention has to be maintained in a water-containing state during operation, meaning that the most preferable operation is obtained in water or high-humidity air.

While in water, the operation of the actuator element may be affected by ions contained in the water; it is nevertheless capable of operation is solutions containing various kinds of ions and solutes. It can, for example, be operated in salt water, although the magnitude of the displacement will be smaller than when operated in pure water.

Figure 2:
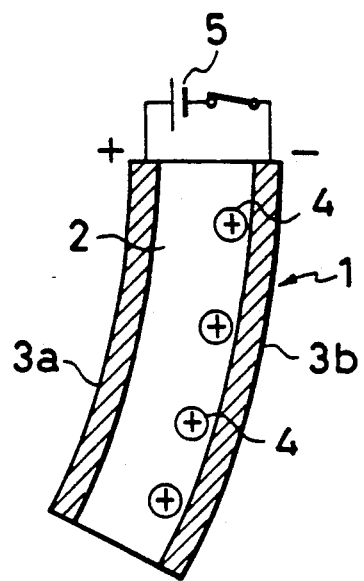
FIG. 2 is a schematic view showing the actuator element of FIG. 1 with an electric potential applied thereto.

The operating mechanism and principle of the actuator element according to the present invention are not known for certain. However, it is thought that the application of a potential difference between the opposite surfaces of the membrane causes cations 4 dispersed within the ion exchange membrane 2 as shown in FIG. 1 to move through the membrane to the side of the negative electrode 3b as shown in FIG. 2 and that this movement of the ions is accompanied by a movement of the water molecules in the membrane. A difference, therefore, arises in the amount of water contained in the positive and negative sides of the membrane. Since the regions whose water content increases swell and those whose water content decreases contract, the difference in the amount of water at the membrane surfaces causes the membrane to bow. However, it is presumed that once the imbalance in ion distribution has been established and movement of the ions stops, the water distribution in the membrane will gradually return to its original uniform state owing to dispersion of exterior water into the membrane. In other words, when the flow of current has diminished following the application of a fixed voltage, the uneven distribution of water content once established in the membrane will gradually become uniform, with the result that the membrane will return to its original unbent state. When an anion exchange membrane is used in pure water, the ions which move can be assumed to be $H^{30}$ ions, and when it is used in salt water, they can be assumed to be $Na^+$ ions When a voltage is applied, therefore, the ions move to the negative electrode side together with water molecules. This means that the water content of the ion exchange membrane increases on the negative electrode side and decreases on the positive electrode side, with the result that the membrane bows toward the positive electrode side.

As will be understood from the foregoing description, the actuator element according to the invention is pliant and of simple structure. It can easily be fabricated in ultra-small size and even under application of a low voltage is capable of developing a force sufficient to overcome the viscous resistance of water or the frictional force of a water surface. Moreover, since it exhibits relatively rapid response and its operation can be controlled by regulating a voltage, it is capable serving as an ultra-small prime mover mechanism in a water environment; a function that conventional actuators are incapable of providing. Because of this capability, the actuator element according to the invention can be used as an artificial muscle for an ultra-small robot for use in water or as a power source or the like for medical devices to be used in vivo.

While the invention will now be described in respect of specific examples, it should be understood that the invention is in no way limited to these examples.

EXAMPLE 1

The opposite sides of a 0.2 mm thick perfluorosulfonfic acid membrane (product of DuPont de Nemours & Co. of the U.S.) were coated with platinum at a coating rate of 3 $mg/cm^2$ by chemical plating. A strip measuring 2 mm in width and 20 mm in length was cut from the resulting composite body to obtain an actuator element. A lead member consisting of a 2 mm-square of platinum foil and a platinum lead wire was pressed onto either side surface of the actuator element at one end thereof and the pair of lead members was fastened with a plastic clamp. The clamp was also used as a jig for suspending the element at a fixed position in pure water and the lead wires were connected with a constant dc voltage source. When a voltage of 0.2 V was applied across the lead wires, the element bowed instantaneously, with the tip thereof moving about 0.1 mm toward the positive electrode side. Although a transient current was observed at the time of voltage application, there was almost no current (less than 10 $\mu A$) one second later. When the applied voltage was reduced to 0 V, the element instantaneously returned to its original unbent state. Then when a voltage of 0.2 V was applied in the opposite polarity, the element bowed in the opposite direction to that referred to above. Increasing the applied voltage to 1 V caused the bending to increase to the point where the tip was displaced about 0.5 mm. Further increase of the applied voltage caused even more pronounced bending. However, electrolysis started at 1.3 V, whereafter current flowed continuously and gas generation was observed.

EXAMPLE 2

A dc voltage was applied to an actuator element fabricated in accordance with Example 1 after it had been soaked in 3% salt water for two hours. Application of a voltage of 1 V caused the tip of the element to move instantaneously by about 1 mm toward the positive electrode side. However, when application of this voltage was continued, the element tip gradually returned to its original position over a period of about 1 second. Then when the applied voltage was reduced to 0 V, the element tip moved about 1 mm in the opposite direction. It thereafter moved about another 1 mm in the same direction when 1 V was applied in the opposite polarity (bringing the total displacement in this direction to about 2 mm). In this case also, it again slowly returned to its original center position over a period of around 1 second. Moreover, a displacement of about 2 mm was obtained when the applied voltage was increased to 1.6 V. In this case, substantially no electrolysis or current flow occurred.

EXAMPLE 3

The opposite surfaces of a 0.15 mm thick polystyrene sulfonic acid membrane (product of Tokuyama Soda Co. Ltd. of Japan) were coated by chemical electroplating with platinum at a coating rate of 1 mg/cm$^2$ and iridium at a coating rate of 2 mg/cm$^2$. A strip measuring 0.3 mm in width and 3 mm in length was cut from the resulting composite body to obtain an actuator element. As in Example 1, platinum lead wires were pressed onto both surfaces at one end of the actuator element and fastened with a plastic clamp. When the element was suspended by the clamp into an approximately 4% salt water solution and a dc voltage of 1.6 V was applied across its lead wires, the element instantaneously bowed to a degree that caused its tip to move about 0.3 mm in the direction of the positive electrode. When a dc voltage of 1.6 V was applied in the opposite polarity, the element bowed in the opposite direction.

EXAMPLE 4

Figure 3:
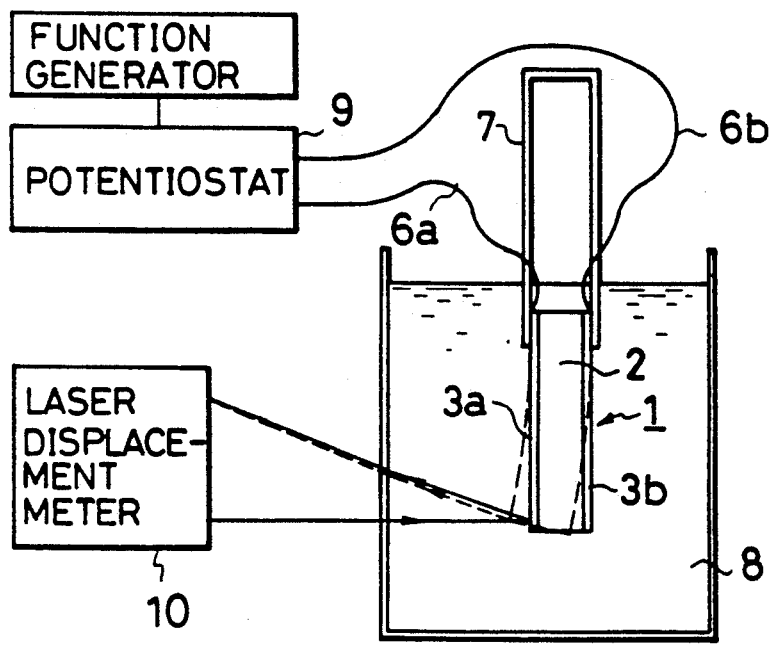
FIG. 3 is a schematic view for explaining how the displacement of the actuator element according to the present invention was measured.

The opposite sides of a 0.1 mm thick perfluorosulfonic acid membrane (product of Asahi Chemical Co. Ltd. of Japan) were coated with platinum at a coating rate of 3 mg/cm$^2$ by chemical plating and a strip measuring 0.5 mm in width and 6 mm in length was cut from the resulting composite body to obtain the actuator element 1 shown in FIG. 3. As illustrated in this figure, platinum lead wires 6a, 6b were pressure-adhered at one end to the platinum coating films on the opposite surfaces of the actuator element and the other ends of the lead wires were connected with a potentiostat 9. The platinum lead wires 6a, 6b were held against the platinum coating films by a plastic clamp 7, which was also used as a jig to fix the actuator element as immersed in a physiological salt water solution 8(a 0.9% aqueous solution of NaCl).

Figure 4:
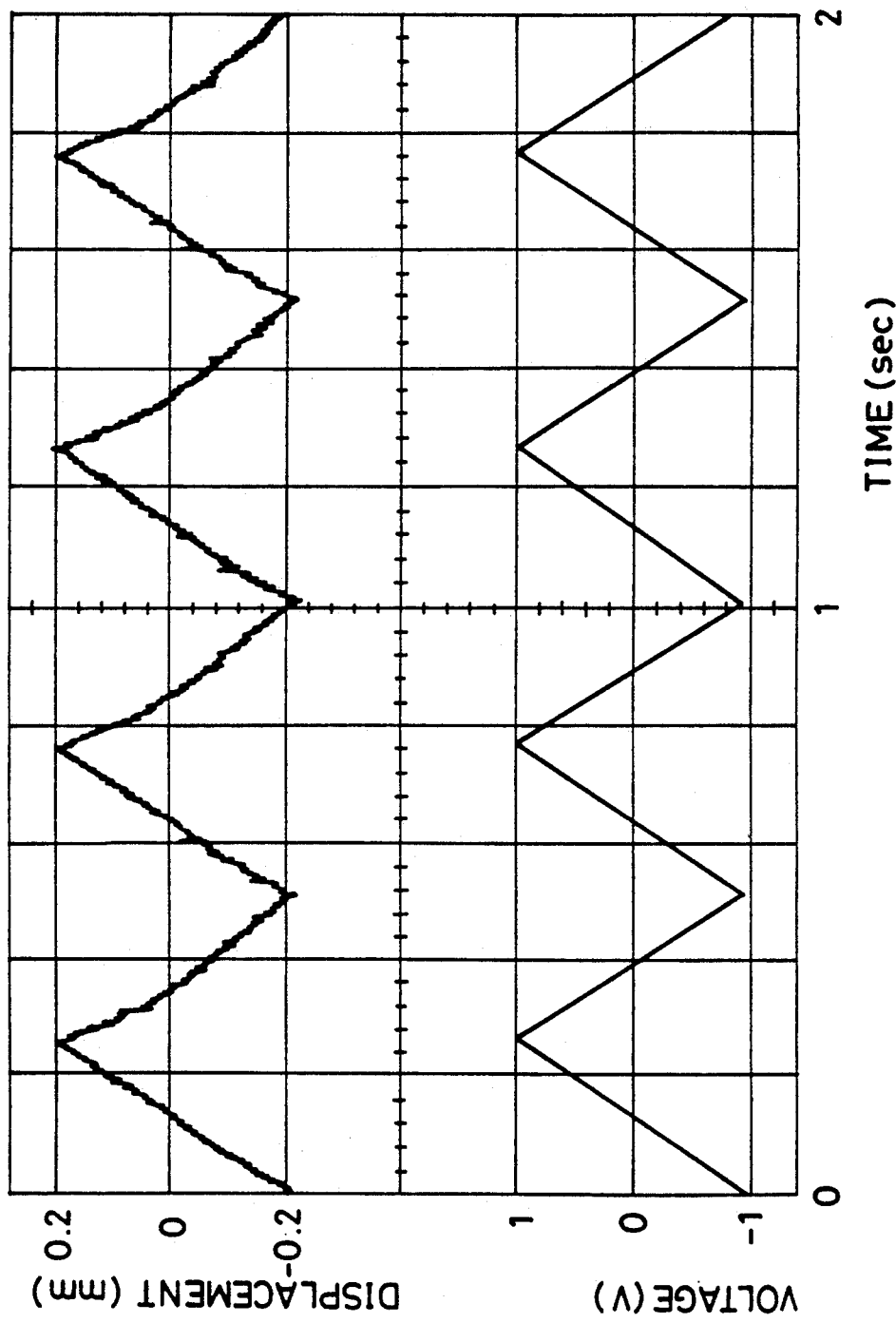
FIG. 4 is a graph showing the relationship between tip displacement and applied voltage when a triangular wave voltage is applied to an actuator element according to the invention.

When a 2 Hz triangular wave with a peak voltage of 1 V was applied to the actuator element, the element bowed in the direction causing its tip to be displaced toward the positive electrode side. A Keyence LC-2100 laser displacement meter was used to measure the displacement of the actuator element tip 5 mm below the point at which the actuator element was fixed by the clamp 7. The results are shown in FIG. 4, the upper half of which indicates the element tip displacement and the lower half of which indicates the waveform of the applied voltage. As can be understood from FIG. 4, the tip displacement was substantially proportional to the applied voltage, voltages of ±1 V causing a displacement of ±0.2 mm. This operation was continued of dozens of hours with no generation of gas. While the size of this element (in terms of volume) was only 1/32nd that of Example 1, its ability to execute rapid movement in water enabled it to produce a force sufficient to overcome the viscous resistance of the aqueous solution, notwithstanding its small size. When the frequency of the applied voltage was increased, the bending operation of the actuator element followed faithfully. Element vibration was observed even at a frequency of 100 Hz. On the other hand, when a rectangular wave of a low frequency on the order of 0.1 Hz was applied, the element first bent toward the positive electrode side by 10 mm immediately upon application of the first voltage pulse, returned to center within several seconds, rapidly bent in the opposite direction when the following pulse of opposite polarity was received, and then slowly returned to center. It then repeated these operations continuously.

EXAMPLE 5

An actuator element fabricated in the manner of Example 4 was soaked for 10 minutes in a 1N NaOH aqueous solution. After its tip had been washed with pure water, the element was immersed in pure water and a 2 Hz triangular wave with a peak voltage of 1 V was applied thereto while the displacement of its free end was measured at a point 5 mm from the support point using the laser displacement meter mentioned earlier. Although the bending operation exhibited the same waveform as that in Example 4, the displacement at ±1 V was ±0.36 mm, which is to say that the displacement per unit voltage was about 1.8 times that in the physiological salt water solution.

EXAMPLE 6

Gold was sputter-deposited to a thickness of 1,000 Å on opposite sides of a 0.2 mm thick perfluorosulfonic acid membrane (product of DuPont de Nemours & Co.) and a strip measuring 2 mm in width and 30 mm in length was cut from the result to obtain an actuator element. When the actuator element was immersed in a physiological salt water solution and applied with a 1 V dc, its tip was displaced toward the negative electrode side by about 0.05 mm.

EXAMPLE 7

The opposite sides of a 0.2 mm thick fluororesin-based anion exchange membrane (Product of Tosoh Corporation of Japan) were coated with platinum at a coating rate of 3 mg/cm$^2$ by chemical plating and a strip measuring 1 mm in width and 30 mm in length was cut from the result to obtain an actuator element. When the actuator element was immersed in a physiological salt water solution and applied with 1 V dc, its tip was displaced toward the negative electrode side by about 0.02 mm.

EXAMPLE 8

The opposite sides of a 0.2 mm thick perfluorosulfonic acid membrane were coated with rhodium at a coating rate of 2 mg/cm$^2$ by chemical plating and a strip measuring 1 mm in width and 12 mm in length was cut from the result to obtain an actuator element. The actuator element was soaked for 10 minutes in a 1N NaOH aqueous solution. After its tip had been washed with pure water, the element was immersed in pure water and a 1 V dc was applied thereto. The tip of the actuator moved about 0.7 mm toward the positive electrode side over a period of about 2 seconds and stopped in this position. When a voltage of opposite polarity was applied, it moved about 0.7 mm toward the negative electrode side and stopped in this position.

What is claimed is:
1. An actuator element comprising:
an organic ion exchange membrane;
a pair of thin metallic layer electrodes attached to opposite surfaces of said membrane;
means for fixing at least one part of said membrane to a stationary position wherein at least one part of said membrane is not fixed to the stationary position; and means for applying an electric potential difference across said membrane in a water-containing state to bend and deform part of said membrane other than said at least one part fixed to a stationary position wherein at least one part of said membrane is not fixed to the stationary position.

2. An actuator element according to claim 10, wherein the organic ion exchange membrane is a cation ion exchange membrane.

3. An actuator element according to claim 10, wherein the organic ion exchange membrane is an anion ion exchange membrane.

4. An actuator element according to claim 2, wherein the cation exchange membrane is a polystyrene sulfonic acid membrane.

5. An actuator element according to claim 2, wherein the cation exchange membrane is a fluororesin ion exchange membrane.

6. An actuator element according to claim 5, wherein the fluororesin ion exchange membrane is a perfluorosulfonic acid membrane.

7. An actuator element according to claim 3, wherein the anion ion exchange membrane is a perfluoroammonium membrane.

8. An actuator element according to claim 10, wherein the organic ion exchange membrane is put in a water-containing state by soaking in water.

9. An actuator element according to claim 10, wherein the pair of electrodes attached to opposite surfaces of the organic ion exchange membrane are formed of at least one noble metal selected from the group consisting of gold, platinum, iridium, palladium, rhodium and ruthenium.

* * * * *

UNITED STATES PATENT AND TRADEMARK OFFICE
CERTIFICATE OF CORRECTION

PATENT NO. :  5,268,082
DATED      :  December 7, 1993
INVENTOR(S):  Keisuke Oguro et al.

It is certified that error appears in the above-indentified patent and that said Letters Patent is hereby corrected as shown below:

On the title page, Item [75],

The first inventor's name should read:   --Keisuke Oguro--

Signed and Sealed this

Third Day of May, 1994

Attest:

BRUCE LEHMAN

Attesting Officer    Commissioner of Patents and Trademarks